US010325500B2

(12) United States Patent
Guo (10) Patent No.: US 10,325,500 B2
(45) Date of Patent: Jun. 18, 2019

(54) METHOD AND APPARATUS FOR DETECTING BLIND SPOT OF UNMANNED VEHICLE

(71) Applicant: Baidu Online Network Technology (Beijing) Co., Ltd., Beijing (CN)

(72) Inventor: Xiaoyan Guo, Beijing (CN)

(73) Assignee: Baidu Online Network Technology (Beijing) Co., Ltd, Beijing (CN)

( * ) Notice: Subject to any disclaimer, the term of this patent is extended or adjusted under 35 U.S.C. 154(b) by 52 days.

(21) Appl. No.: 15/615,699

(22) Filed: Jun. 6, 2017

(65) Prior Publication Data
US 2018/0151079 A1 May 31, 2018

(30) Foreign Application Priority Data
Nov. 30, 2016 (CN) .......................... 2016 1 1079840

(51) Int. Cl.
| | |
|---|---|
| *G01C 22/00* | (2006.01) |
| *G05D 1/00* | (2006.01) |
| *G08G 1/16* | (2006.01) |
| *G01S 7/40* | (2006.01) |
| *G01S 13/04* | (2006.01) |
| *G01S 13/93* | (2006.01) |
| *G05D 1/02* | (2006.01) |
| *H01Q 1/00* | (2006.01) |
| *B60R 11/04* | (2006.01) |
| *B60R 11/00* | (2006.01) |

(52) U.S. Cl.
CPC ............ *G08G 1/167* (2013.01); *G01S 7/4021* (2013.01); *G01S 13/04* (2013.01); *G01S 13/931* (2013.01); *G05D 1/0238* (2013.01); *G05D 1/0257* (2013.01); *B60R 11/04* (2013.01); *B60R 2011/0084* (2013.01); *B60Y 2200/40* (2013.01); *G01S 2007/403* (2013.01); *G01S 2013/9332* (2013.01); *G05D 1/0088* (2013.01)

(58) Field of Classification Search
CPC ....... G08G 1/167; G01S 7/4021; G01S 13/04; G01S 13/931; G05D 1/0238; G05D 1/0257
USPC .............................................. 701/23; 343/904
See application file for complete search history.

(56) References Cited

U.S. PATENT DOCUMENTS

2010/0277397 A1\* 11/2010 Scott ........................ G01D 1/00
343/904
2018/0039267 A1\* 2/2018 Miyake ................ G05D 1/0055

\* cited by examiner

*Primary Examiner* — Mahmoud S Ismail
(74) *Attorney, Agent, or Firm* — Knobbe Martens Olson & Bear LLP (57) ABSTRACT

The present disclosure discloses a method and apparatus for detecting blind zone of an unmanned vehicle. A specific embodiment of the method comprises: receiving a detection initiating request, the detection initiating request including: a position of the vertical shaft, a length of the vertical shaft and a set movement speed of the vertical shaft; detecting the vertical shaft; determining an anticipated detection time based on the position of the vertical shaft and the set movement speed; recording an actual detection time in response to detecting the vertical shaft; determining a missed detection position of the vertical shaft based on a time difference between the actual detection time and the anticipated detection time and the set movement speed, in response to confirming the actual detection time being different from the anticipated detection time; and determining a blind zone based on the length of the vertical shaft and the missed detection position.

15 Claims, 5 Drawing Sheets

METHOD AND APPARATUS FOR DETECTING BLIND SPOT OF UNMANNED VEHICLE

CROSS-REFERENCE TO RELATED APPLICATION

This application is related to and claims priority from Chinese Application No. 201611079840.7, filed on Nov. 30, 2016, entitled "Method and Apparatus for Detecting Blind zone of Unmanned Vehicle," the entire disclosure of which is hereby incorporated by reference.

TECHNICAL FIELD

The present disclosure relates to the field of unmanned vehicle technology, specifically to the field of unmanned vehicle detection technology, and more specifically to a method and apparatus for detecting blind zone of an unmanned vehicle.

BACKGROUND

The unmanned vehicle can automatically identify traffic signs and other driving information, being equipped with radar, camera, global satellite navigation and other electronic facilities, and installed with synchronized sensors. The driver only needs to enter a destination into the navigation system, the vehicle can automatically travel to the destination. During the travel, the vehicle may upload traffic information through the sensor equipment, perform a realtime location analysis based on a large amount of data, to determine the travel direction and speed.

The sensor of the unmanned vehicle quickly detects the distance of the obstacle to the unmanned vehicle and prevents the a traffic accident from happening by alarming or automatically performing a certain preset operation in a dangerous situation. However, there is a detection blind zone in the sensor, when encountering an obstacle too low or too close, the sensor may not respond properly. As the distance from the obstacle to the car getting closer, the relative height value changes accordingly, and the risk also increases. Therefore, there is an urgent need to develop a technology for detecting blind zone of the unmanned vehicle to improve traffic safety.

SUMMARY

The objective of the present disclosure is to provide a method and apparatus for detecting blind zone of an unmanned vehicle, in order to solve the technical problem mentioned in the foregoing Background section.

In a first aspect, the present disclosure provides a method for detecting blind zone of an unmanned vehicle, the unmanned vehicle and one end of a telescopic crossbar being connected by a pivot, another end of the crossbar being connected to a telescopic vertical shaft and the crossbar rotating about the pivot to drive the vertical shaft to move, the method comprises: receiving a detection initiating request, wherein the detection initiating request includes: a position of the vertical shaft, a length of the vertical shaft and a set movement speed of the vertical shaft; performing the following detection steps: detecting the vertical shaft; determining an anticipated detection time based on the position of the vertical shaft and the set movement speed; recording an actual detection time in response to detecting the vertical shaft; determining a missed detection position of the vertical shaft based on a time difference between the actual detection time and the anticipated detection time and the set movement speed, in response to confirming the actual detection time being different from the anticipated detection time; and determining a blind zone based on the length of the vertical shaft and the missed detection position.

In some embodiments, the method further comprises: receiving a crossbar length change detection request, wherein the crossbar length change detection request includes a detection initiating time when the current length of the crossbar is changed, a position of the vertical shaft after the current length of the crossbar is changed and a set movement speed of the vertical shaft after the current length of the crossbar is changed; performing the above detection steps according to the detection initiating time when the current length of the crossbar is changed.

In some embodiments, the method further comprises: receiving a crossbar length and vertical shaft length change detection request, wherein the crossbar length and vertical shaft length change detection request includes a detection initiating time when the current length of the crossbar and the vertical shaft is changed, a length of the vertical shaft after the current change, a position of the vertical shaft after the current length of the crossbar and the vertical shaft is changed and a set movement speed of the vertical shaft after the current length of the crossbar and the vertical shaft is changed; performing the above detection steps according to the detection initiating time when the current length of the crossbar and the vertical shaft is changed.

In some embodiments, the length of the vertical shaft is a preset minimum length of the vertical shaft.

In some embodiments, the length of the crossbar is proportional to the length of the vertical shaft.

In a second aspect, the present disclosure provides an apparatus for detecting blind zone of an unmanned vehicle, the unmanned vehicle and one end of a telescopic crossbar being connected by a pivot, another end of the crossbar being connected to a telescopic vertical shaft and the crossbar rotating about the pivot to drive the vertical shaft to move, the apparatus comprises: a receiving unit, configured to receive a detection initiating request, wherein the detection initiating request includes: a position of the vertical shaft, a length of the vertical shaft and a set movement speed of the vertical shaft; a detection unit, configured to perform the following detection steps: detecting the vertical shaft; determining an anticipated detection time based on the position of the vertical shaft and the set movement speed; recording an actual detection time in response to detecting the vertical shaft; determining a missed detection position of the vertical shaft based on a time difference between the actual detection time and the anticipated detection time and the set movement speed, in response to confirming the actual detection time being different from the anticipated detection time; and determining a blind zone based on the length of the vertical shaft and the missed detection position.

In some embodiments, the receiving unit is further configured to: receive a crossbar length change detection request, wherein the crossbar length change detection request includes a detection initiating time when the current length of the crossbar is changed, a position of the vertical shaft after the current length of the crossbar is changed and a set movement speed of the vertical shaft after the current length of the crossbar is changed; and the detection unit is further configured to perform the above detection steps according to the detection initiating time when the current length of the crossbar is changed.

In some embodiments, the receiving unit is further configured to: receive a crossbar length and vertical shaft length change detection request, wherein the crossbar length and vertical shaft length change detection request includes a detection initiating time when the current length of the crossbar and the vertical shaft is changed, a length of the vertical shaft after the current change, a position of the vertical shaft after the current length of the crossbar and the vertical shaft is changed and a set movement speed of the vertical shaft after the current length of the crossbar and the vertical shaft is changed; and the detection unit is further configured to perform the above detection steps according to the detection initiating time when the current length of the crossbar and the vertical shaft is changed.

In some embodiments, the length of the vertical shaft is a preset minimum length of the vertical shaft.

In some embodiments, the length of the crossbar is proportional to the length of the vertical shaft.

By receiving a detection request including a length, position and set movement speed of the vertical shaft (i.e., the obstacle), determining an anticipated detection time of the vertical shaft, determining a missed detection time after comparing the anticipated detection time with the actual detection time, the method and apparatus for detecting blind zone of an unmanned vehicle provided by the present disclosure can determine the position of the vertical shaft when a missed detection happens based on the known movement speed and track of the vertical shaft, and determine the blind zone by combining each of the missed detection positions, thus achieving a quick and accurate determination of the blind zone with a wide detection coverage and less missed detections.

BRIEF DESCRIPTION OF THE DRAWINGS

Other features, objectives and advantages of the present disclosure will become more apparent upon reading the detailed description to non-limiting embodiments with reference to the accompanying drawings, wherein.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
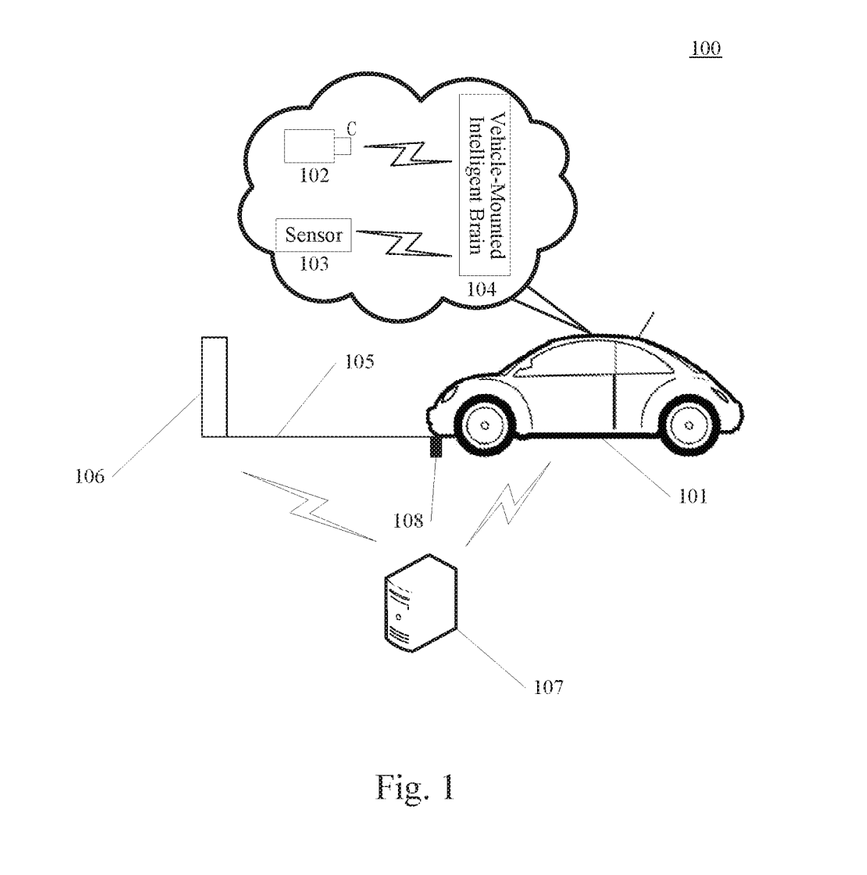
FIG. 1 is an exemplary system architecture diagram in which the present disclosure may be applied.

FIG. 1 shows an exemplary system architecture 100 in which the embodiments of the method or apparatus for detecting blind zone of an unmanned vehicle of the present disclosure may be applied.

As shown in FIG. 1, the system architecture 100 may include an unmanned vehicle 101, a controller 107, a telescopic crossbar 105 and a telescopic vertical shaft 106. The vertical shaft 106 is used to verify the detection function of sensors 102, 103 of the unmanned vehicle 101. The unmanned vehicle 101 is connected to one end of the crossbar 105 by a pivot 108, the other end of the crossbar 105 is connected to the vertical shaft 106 and the crossbar 105 rotates about the pivot 108 to drive the vertical shaft to move. The crossbar 105 is parallel to the ground, and the vertical shaft 106 is perpendicular to the crossbar 105 and the ground.

The sensor devices 102, 103 and a vehicle-mounted intelligent brain 104 may be installed on the unmanned vehicle 101. The sensor devices 102, 103 may send the information collected by the sensor to the vehicle-mounted intelligent brain 104 through various communication modes (e.g., wired, wireless communication links or fiber optic cables, etc.). The sensor devices 102, 103 may be a variety of electronic devices capable of collecting information of the vertical shaft 106, including but not limited to cameras, radars, etc. The vehicle-mounted intelligent brain 104 may receive and analyze the information sent by the sensor devices 102, 103 and feed back the analysis result to the controller 107 or other controllers that may be used to process blind zone information of the unmanned vehicle.

The controller 107 may be a controller that provides various services, such as setting the movement trajectory and movement speed of the vertical shaft 106, sending relevant information of the vertical shaft 106 to the vehicle-mounted intelligent brain 104, commanding the unmanned vehicle 101 to start detecting and processing a detected blind zone. It is also possible to perform the detection by setting the rotation time for the crossbar 105 and setting the detection time for the unmanned vehicle in advance, or realizing the function of the controller 107 by the vehicle-mounted intelligent brain 104, without providing the controller 107.

It should be noted that the method for detecting blind zone of an unmanned vehicle provided by the present disclosure embodiment is generally performed by the vehicle-mounted intelligent brain 104, and accordingly, the apparatus for detecting blind zone of an unmanned vehicle is generally provided in the vehicle-mounted intelligent brain 104.

It should be appreciated that the numbers of the sensor devices, the unmanned vehicles and the controllers in FIG. 1 are merely illustrative. Any number of sensor devices, unmanned vehicles and controllers may be provided based on the actual requirements.

Figure 2:
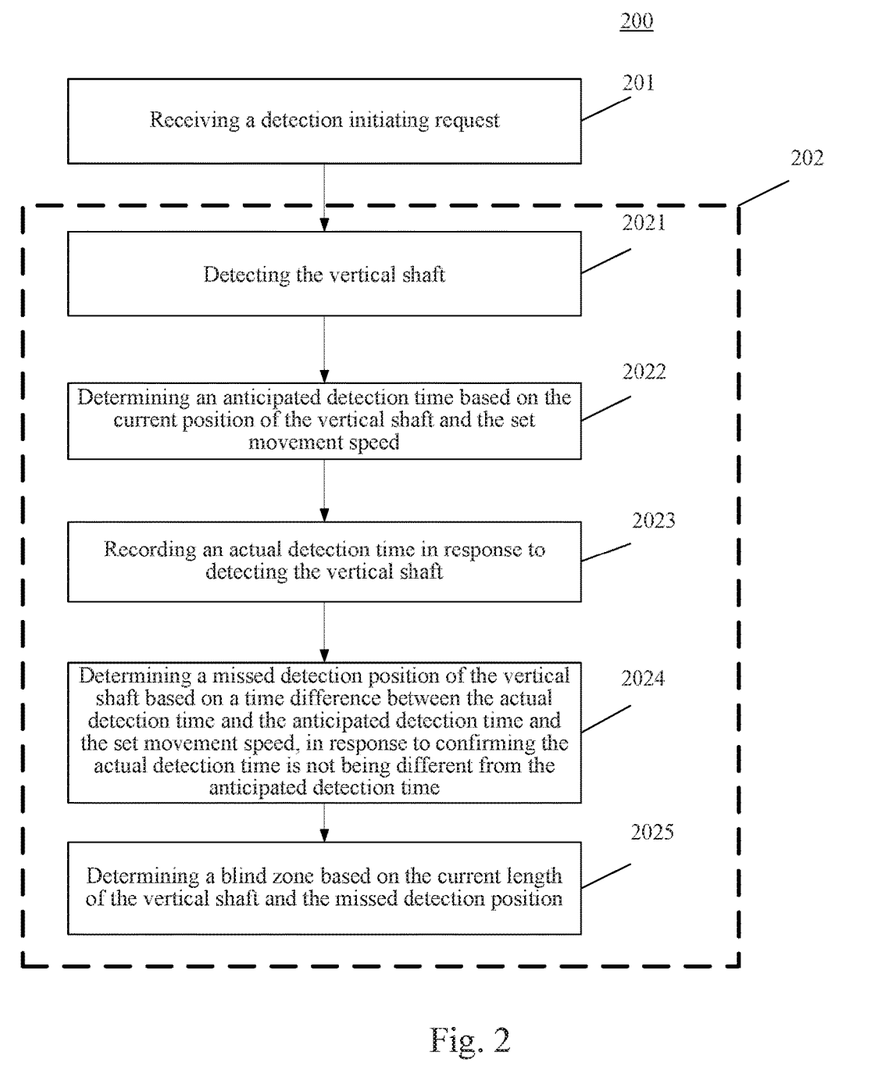
FIG. 2 is a flowchart of an embodiment of a method for detecting blind zone of an unmanned vehicle according to the present disclosure.

With further reference to FIG. 2, a flow 200 of an embodiment of the method for detecting blind zone of an unmanned vehicle according to the present disclosure is shown. The method for detecting blind zone of an unmanned vehicle includes the following steps:

Step 201, receiving a detection initiating request.

In the present embodiment, an electronic device (e.g., the vehicle-mounted intelligent brain of the unmanned vehicle as illustrated in FIG. 1) on which the method for detecting blind zone of an unmanned vehicle operate may receive from the controller (e.g., the controller 107 as shown in FIG. 1) via a wired connection or a wireless connection (e.g., a Bluetooth mode) a detection initiating request, wherein the detection initiating request includes a position of the vertical shaft, a length of the vertical shaft and a set movement speed of the vertical shaft. The position of the vertical shaft is the initial position of the vertical shaft when the test is initiated, which is a position of the vertical shaft relative to the pivot. The length of the crossbar is the distance between the vertical shaft and the pivot. The crossbar starts to rotate from the edge of the unmanned vehicle. The rotation angle of the crossbar is the angle between the crossbar and the unmanned vehicle. The position of the vertical shaft may be determined by the rotation angle and length of the crossbar. The set movement speed of the vertical shaft is determined by the rotation speed of the crossbar, for example, 18 degrees per second. The vertical shaft and the crossbar are connected in the same way as shown in FIG. 1, that is, the crossbar is parallel to the ground, and the vertical shaft is perpendicular to the crossbar and the ground. The crossbar is connected to the unmanned vehicle by the pivot and the height of the crossbar to the ground is adjustable. The crossbar may be connected to the position to-be-detected of the unmanned vehicle, for example, the front of the unmanned vehicle, the rear of the unmanned vehicle or the both sides of the unmanned vehicle. The length of the vertical shaft and the crossbar is in the range of 0.1 m to 1 m. The vertical shaft and the crossbar are provided with control apparatus and communication apparatus for receiving the rotation speed of the crossbar, the length of the crossbar, the length of the vertical shaft, the initiating position of the vertical shaft set by the controller via wired or wireless means, and beginning to adjust the length and rotating in accordance with the preset rotation speed according to the set contents. The controller notifies the time when the unmanned vehicle begins the detection. The distance between the bottom end of the vertical shaft and the ground may be determined by the connection position of the crossbar and the unmanned vehicle. The length of the vertical shaft needs to be added to the distance when determining the blind zone.

Step 202, performing the following detection steps:

Step 2021, detecting the vertical shaft.

In the present embodiment, the sensor device mounted on the unmanned vehicle detects the vertical shaft and collects the sensing data if the sensor device can detect the vertical shaft, and if the sensor device has a ranging function, it may also detect the position of the vertical shaft.

Step 2022, determining an anticipated detection time based on the position of the vertical shaft and the set movement speed.

In the present embodiment, it is possible to determine at which point the vertical shaft may be detected, i.e., the anticipated detection time, based on the position of the vertical shaft and the set movement speed, for example, if the sensor of the unmanned vehicle is detected once per second, it can be anticipated that the data for detecting the vertical shaft may be acquired every second within the anticipated movement time of the vertical shaft.

Step 2023, recording an actual detection time in response to detecting the vertical shaft.

In the present embodiment, if the data for detecting the vertical shaft is obtained in the actual detection process, the actual detection time is recorded.

Step 2024, determining a missed detection position of the vertical shaft based on a time difference between the actual detection time and the anticipated detection time and the set movement speed, in response to confirming the actual detection time being different from the anticipated detection time.

In the present embodiment, if the actual detection time does not coincide with the anticipated detection time, it can be determined that a missed detection occurs. A missed detection time may be determined based on the time difference in between, and the position of the vertical shaft when the missed detection occurs may be calculated based on the movement speed of the vertical shaft. For example, assuming that the vertical shaft rotates 18 degrees per second, the anticipated detection time is 1 second, 2 seconds, 3 seconds, 4 seconds 10 seconds, and the actual detection time is 5 seconds and 6 seconds, then 1 second-4 seconds, 7 seconds-10 seconds is the missed detection time. According to the movement speed of the vertical shaft, it can be calculated that when the missed detections occur, the rotation angles of the crossbar are 18 degrees, 36 degrees, 54 degrees, 72 degrees, 126 degrees, 144 degrees, 162 degrees and 180 degrees. The position of the vertical shaft when the missed detection occurs may be determined with further combination to the current length of the crossbar.

Step 2025, determining a blind zone based on the length of the vertical shaft and the missed detection position.

In the present embodiment, the missed detection position obtained in step 2024 is combined with the length of the vertical shaft to obtain the blind zone. For example, taking the front of the car as the center, if the radius of a semicircular arc is 1 meter, the length of its vertical shaft is 0.2 meters. The length of the vertical shaft refers to the length of the vertical shaft relative to the ground.

Figure 3:
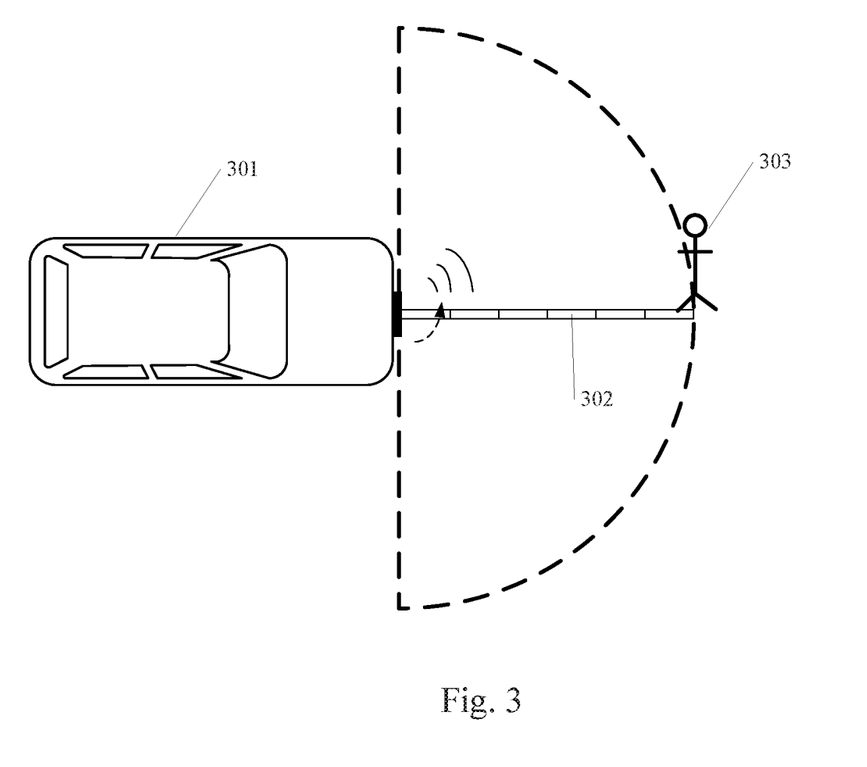
FIG. 3 is a schematic diagram of an application scenario of the method for detecting blind zone of an unmanned vehicle according to the present disclosure.

With further reference to FIG. 3, which is a schematic diagram of an application scenario of the method for detecting blind zone of an unmanned vehicle according to the present embodiment. In the application scenario of FIG. 3, the user connects the to-be-detected portion (e.g., the front) of the unmanned vehicle 301 to the telescopic crossbar 302. The controller controls the length of the crossbar 302, the length of the vertical shaft 303 (during a child blind zone detection process, the vertical shaft may be a height-adjustable child model) and the rotation speed of the crossbar 302. After the controller has set the parameters of the crossbar 302 and the vertical shaft 303 (for example, the length of the crossbar is 1 meter and the length of the vertical shaft is 1 meter), the unmanned vehicle 301 is notified to start the detection and the crossbar 302 is instructed to rotate in a rotation speed of 10 degrees per second. The crossbar 302 rotates 180 degrees to drive the vertical shaft 303 to move half an arc. During the movement of the vertical shaft 303, the unmanned vehicle 301 keeps on detecting the vertical shaft 303. Assuming that it may be determined that the vertical shaft 303 should be detected at the $9^{th}$ second after the initiation, that is, the anticipated detection time is the $9^{th}$ second, based on the parameters of the crossbar 302 and the vertical shaft 303 sent by the controller, but the detection data is not acquired at the $9^{th}$ second in the actual detection result, it may be determined that a missed detection occurs at the $9^{th}$ second. The position of the vertical shaft 303 when the missed detection occurs is determined to be the point of the crossbar rotating by 90 degrees on the half of the arc based on the movement speed of the vertical shaft 303. Since the point is a point within the blind zone, the blind zone can be formed by each missed detection point to constitute an obstacle with a height of 1 meter.

By detecting the vertical shaft in a circular motion, the method provided by the above embodiments of the present disclosure can determine the position of the blind zone quickly and accurately. In addition, the detection can cover vertical shafts of a variety of positions and lengths, a missed detection is therefore less easy to occur, and the efficiency and accuracy of the detection is improved.

Figure 4:
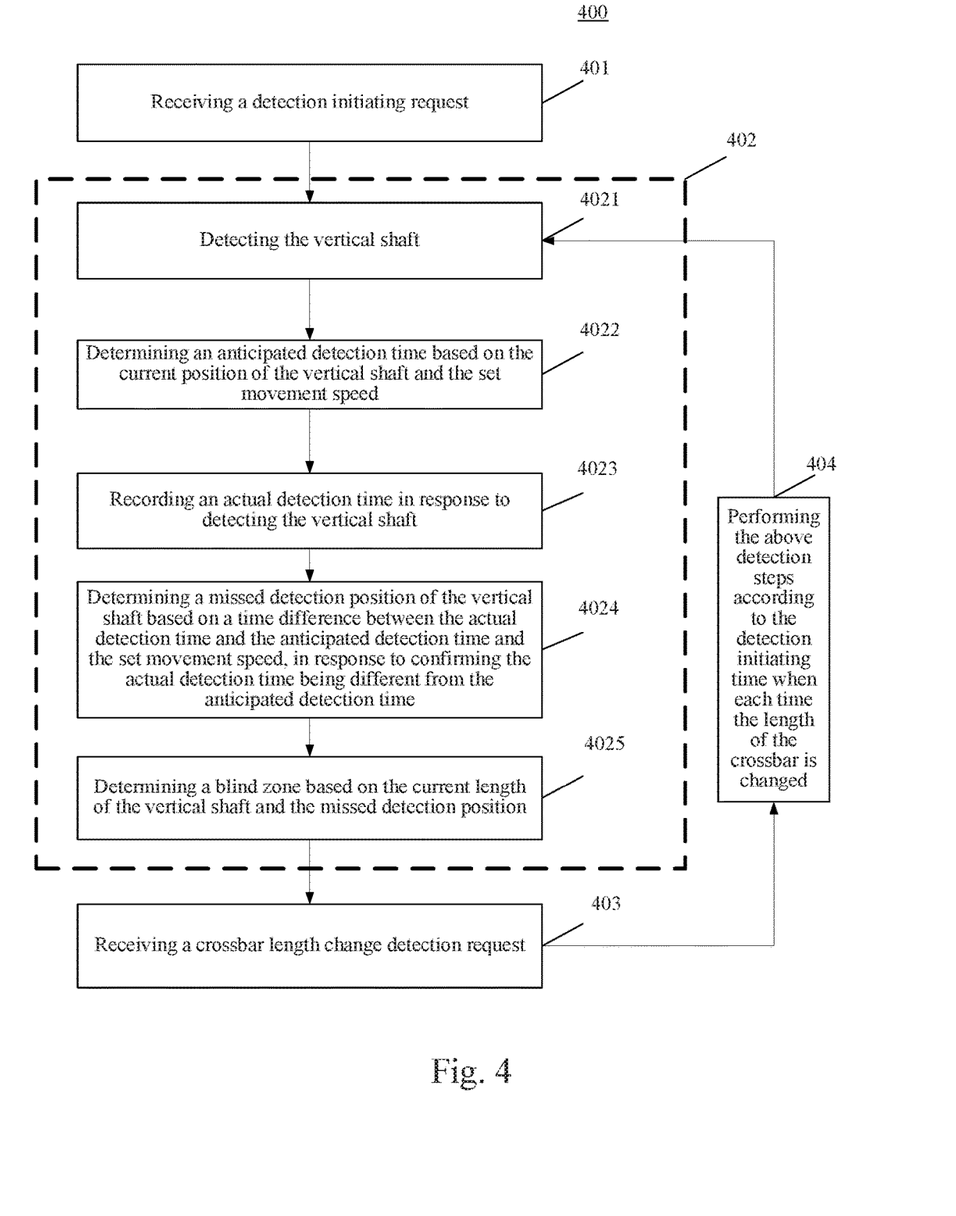
FIG. 4 is a flowchart of another embodiment of the method for detecting blind zone of an unmanned vehicle according to the present disclosure.

With further reference to FIG. 4, a flow 400 of another embodiment of the method for detecting blind zone of an unmanned vehicle is shown. The flow 400 of the method for detecting blind zone of an unmanned vehicle includes the following steps:

Step 401, receiving a detection initiating request.

Step 402, performing the following detection steps:

Step 4021, detecting the vertical shaft.

Step 4022, determining an anticipated detection time based on the position of the vertical shaft and the set movement speed.

Step 4023, recording an actual detection time in response to detecting the vertical shaft.

Step 4024, determining a missed detection position of the vertical shaft based on a time difference between the actual detection time and the anticipated detection time and the set movement speed, in response to confirming the actual detection time being different from the anticipated detection time.

Step 4025, determining a blind zone based on the length of the vertical shaft and the missed detection position.

The steps 401-4025 are substantially the same to the steps 201-2025, therefore detailed description thereof is omitted.

Step 403, receiving a crossbar length change detection request.

In the present embodiment, the receiving the crossbar length change detection request includes a detection initiating time when the current length of the crossbar is changed, a position of the vertical shaft after the current length of the crossbar is changed and a set movement speed of the vertical shaft after the current length of the crossbar is changed. The crossbar length change detection request may include relative information after a plurality of change of the length of the crossbar, for example, the length of the shaft is 1 meter at step 401, the length of the crossbar in the received crossbar length change detection request is changed from 1 meter to 0.9 meters, 0.8 meters, 0.7 meters 0.1 meters, the current change is 0.1 meters, so that the position of the vertical shaft in the current detection has also undergone a corresponding change. The controller also informs the unmanned vehicle to initiate the detection time after the current change of the length of the crossbar.

In some alternative implementations of the present embodiment, the receiving a crossbar length change detection request also includes a length of the vertical shaft after the current change of the length of the crossbar, and the length of the vertical shaft may be proportional to the length of the crossbar. For example, the length of the crossbar is 1 meter in the first detection, the length of the vertical shaft is also 1 meter, the length of the crossbar is 0.9 meters in the second detection, and the length of the vertical shaft is also 0.9 meters, and so on until the preset minimum length of the crossbar is reached. That is, when the current length of the crossbar changes, the length of the vertical shaft is synchronously changed.

In some alternative implementations of the present embodiment, the receiving a crossbar length change detection request also includes a length of the vertical shaft after the current change of the length of the crossbar, the length of the vertical shaft is a preset minimum length of the vertical shaft. For example, when the current length of the crossbar changes, the length of the vertical shaft is 0.1 meters.

Step 404, performing the above detection steps according to the detection initiating time when the current length of the crossbar is changed.

In the present embodiment, the detection step 402 is performed in accordance with the detection initiating time received at step 403. If the length of the crossbar is changed by 10 times, the detection step is performed 10 times.

As can be seen from FIG. 4, the flow 400 of the method for detecting blind zone of an unmanned vehicle of the present embodiment, as compared with the embodiment corresponding to FIG. 2, highlights the step of expanding the movement trajectory of the vertical shaft. Thus, the solution described by the present embodiment may introduce more movement trajectories of the vertical shaft, achieving a more complete detection of blind zone of the unmanned vehicles.

Figure 5:
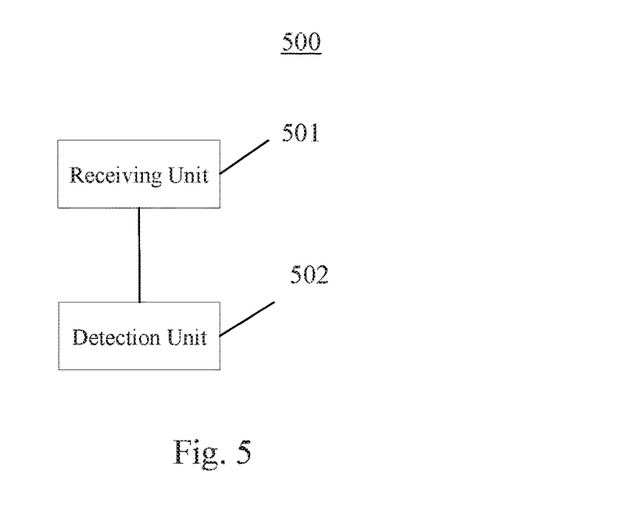
FIG. 5 is a schematic structural diagram of an embodiment of an apparatus for detecting blind zone of an unmanned vehicle according to the present disclosure.

With further reference to FIG. 5, as an implementation to the method illustrated in the above figures, the present disclosure provides an embodiment of an apparatus for detecting blind zone of an unmanned vehicle. The apparatus embodiment corresponds to the method embodiment shown in FIG. 2, and may be specifically applied to various electronic devices.

As shown in FIG. 5, the unmanned vehicle and one end of a telescopic crossbar is connected by a pivot, another end of the crossbar is connected to a telescopic vertical shaft, and the crossbar rotates about the pivot to drive the vertical shaft to move. The apparatus 500 for detecting blind zone of an unmanned vehicle of the present embodiment includes: a receiving unit 501 and a detection unit 502. The receiving unit 501 is configured to receive a detection initiating request, wherein the detection initiating request includes: a position of the vertical shaft, a length of the vertical shaft and a set movement speed of the vertical shaft. The detection unit 502 is configured to perform the following detection steps: detecting the vertical shaft; determining an anticipated detection time based on the position of the vertical shaft and the set movement speed; recording an actual detection time in response to detecting the vertical shaft; determining a missed detection position of the vertical shaft based on a time difference between the actual detection time and the anticipated detection time and the set movement speed, in response to confirming the actual detection time being different from the anticipated detection time; and determining a blind zone based on the length of the vertical shaft and the missed detection position.

In the present embodiment, the receiving unit 501 receives information relating to the position and the vertical shaft to be detected. Then the detection unit 502 determines the anticipated detection time and obtains the actual detection time, and determines the blind zone based on a time difference between the actual detection time and the anticipated detection time and the information relating to the position and the vertical shaft.

In some alternative implementations of the present embodiment, the receiving unit 501 is further configured to: receive a crossbar length change detection request, wherein the crossbar length change detection request includes a detection initiating time when the current length of the crossbar is changed, a position of the vertical shaft after the current length of the crossbar is changed and a set movement speed of the vertical shaft after the current length of the crossbar is changed; and the detection unit 502 is further configured to perform the above detection steps according to the detection initiating time when the current length of the crossbar is changed.

In some alternative implementations of the present embodiment, the receiving unit 501 is further configured to:

receive a crossbar length and vertical shaft length change detection request, wherein the crossbar length and vertical shaft length change detection request includes a detection initiating time when the current length of the crossbar and the vertical shaft is changed, a length of the vertical shaft after the current change, a position of the vertical shaft after the current length of the crossbar and the vertical shaft is changed and a set movement speed of the vertical shaft after the current length of the crossbar and the vertical shaft is changed; and the detection unit 502 is further configured to perform the above detection steps according to the detection initiating time when the current length of the crossbar and the vertical shaft is changed.

In some alternative implementations of the present embodiment, the length of the vertical shaft is a preset minimum length of the vertical shaft.

In some alternative implementations of the present embodiment, the length of the crossbar is proportional to the length of the vertical shaft.

Figure 6:
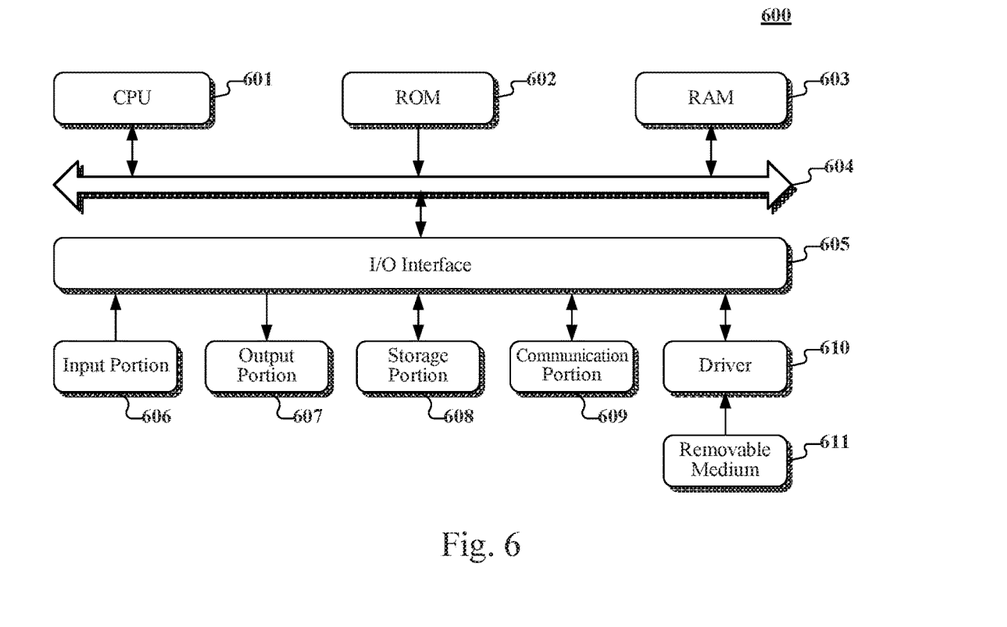
FIG. 6 is a schematic structural diagram of a computer system adapted to implement a vehicle-mounted intelligent brain according to embodiments of the present disclosure.

Referring to FIG. 6, a schematic structural diagram of a computer system 600 adapted to implement a vehicle-mounted intelligent brain of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present application.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a receiving unit and a detecting unit, where the names of these units or modules are not considered as a limitation to the units or modules. For example, the receiving unit may also be described as "a unit for receiving a detection initiating request."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: receiving a detection initiating request, the detection initiating request including: a position of the vertical shaft, a length of the vertical shaft and a set movement speed of the vertical shaft; detecting the vertical shaft; determining an anticipated detection time based on the position of the vertical shaft and the set movement speed; recording an actual detection time in response to detecting the vertical shaft; determining a missed detection position of the vertical shaft based on a time difference between the actual detection time and the anticipated detection time and the set movement speed, in response to confirming the actual detection time being different from the anticipated detection time; and determining a blind zone based on the length of the vertical shaft and the missed detection position. This embodiment can determine the blind zone of the unmanned vehicle quickly and accurately.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for detecting blind zone of an unmanned vehicle, the unmanned vehicle and one end of a telescopic crossbar being connected by a pivot, another end of the telescopic crossbar being connected to a telescopic vertical shaft, the telescopic vertical shaft being perpendicular to the telescopic crossbar and the ground, and the telescopic crossbar rotating about the pivot to drive the telescopic vertical shaft to move, the method comprising:

receiving a detection initiating request, the detection initiating request including: a position of the telescopic vertical shaft, a length of the telescopic vertical shaft and a set movement speed of the telescopic vertical shaft; and performing the following detection steps: detecting the telescopic vertical shaft; determining an anticipated detection time based on the position of the telescopic vertical shaft and the set movement speed; recording an actual detection time in response to detecting the telescopic vertical shaft; determining a missed detection position of the telescopic vertical shaft based on a time difference between the actual detection time and the anticipated detection time and the set movement speed, in response to confirming the actual detection time being different from the anticipated detection time; and determining a blind zone based on the length of the telescopic vertical shaft and the missed detection position.

2. The method according to claim 1, the method further comprising:

receiving a crossbar length change detection request, wherein the crossbar length change detection request includes a detection initiating time when a current length of the telescopic crossbar is changed, a position of the telescopic vertical shaft after the current length of the telescopic crossbar is changed and a set movement speed of the telescopic vertical shaft after the current length of the telescopic crossbar is changed; and performing the above detection steps according to the detection initiating time when the current length of the telescopic crossbar is changed.

3. The method according to claim 1, the method further comprising:

receiving a crossbar length and vertical shaft length change detection request, wherein the crossbar length and vertical shaft length change detection request includes a detection initiating time when a current length of the telescopic crossbar and the telescopic vertical shaft is changed, a length of the telescopic vertical shaft after the current change, a position of the telescopic vertical shaft after the current length of the telescopic crossbar and the telescopic vertical shaft is changed and a set movement speed of the telescopic vertical shaft after the current length of the telescopic crossbar and the telescopic vertical shaft is changed; and performing the above detection steps according to the detection initiating time when the current length of the telescopic crossbar and the telescopic vertical shaft is changed.

4. The method according to claim 2, wherein the length of the telescopic vertical shaft is a preset minimum length of the telescopic vertical shaft.

5. The method according to claim 3, wherein a length of the telescopic crossbar is proportional to the length of the telescopic vertical shaft.

6. An apparatus for detecting blind zone of an unmanned vehicle, the unmanned vehicle and one end of a telescopic crossbar being connected by a pivot, another end of the telescopic crossbar being connected to a telescopic vertical shaft, the telescopic vertical shaft being perpendicular to the telescopic crossbar and the ground, and the telescopic crossbar rotating about the pivot to drive the telescopic vertical shaft to move, the apparatus comprising:

at least one processor; and a memory storing instructions, which when executed by the at least one processor, cause the at least one processor to perform operations, the operations comprising:

receiving a detection initiating request, wherein the detection initiating request includes: a position of the telescopic vertical shaft, a length of the telescopic vertical shaft and a set movement speed of the telescopic vertical shaft; and performing the following detection steps: detecting the telescopic vertical shaft; determining an anticipated detection time based on the position of the telescopic vertical shaft and the set movement speed; recording an actual detection time in response to detecting the telescopic vertical shaft; determining a missed detection position of the telescopic vertical shaft based on a time difference between the actual detection time and the anticipated detection time and the set movement speed, in response to confirming the actual detection time being different from the anticipated detection time; and determining a blind zone based on the length of the telescopic vertical shaft and the missed detection position.

7. The apparatus according to claim 6, the operations further comprising:

receiving a crossbar length change detection request, wherein the crossbar length change detection request includes a detection initiating time when a current length of the telescopic crossbar is changed; a position of the telescopic vertical shaft after the current length of the telescopic crossbar is changed and a set movement speed of the telescopic vertical shaft after the current length of the telescopic crossbar is changed; and performing the above detection steps according to the detection initiating time when the current length of the telescopic crossbar is changed.

8. The apparatus according to claim 6, the operations further comprising:

receiving a crossbar length and vertical shaft length change detection request, wherein the crossbar length and vertical shaft length change detection request includes a detection initiating time when a current length of the telescopic crossbar and the telescopic vertical shaft is changed, a length of the telescopic vertical shaft after the current change, a position of the telescopic vertical shaft after the current length of the telescopic crossbar and the telescopic vertical shaft is changed and a set movement speed of the telescopic vertical shaft after the current length of the telescopic crossbar and the telescopic vertical shaft is changed; and performing the above detection steps according to the detection initiating time when the current length of the telescopic crossbar and the telescopic vertical shaft is changed.

9. The apparatus according to claim 7, wherein the length of the telescopic vertical shaft is a preset minimum length of the telescopic vertical shaft.

10. The apparatus according to claim 8, wherein a length of the telescopic crossbar is proportional to the length of the telescopic vertical shaft.

11. A non-transitory computer storage medium storing a computer program, which when executed by one or more processors, cause the one or more processors to perform operations for detecting blind zone of an unmanned vehicle, the unmanned vehicle and one end of a telescopic crossbar being connected by a pivot, another end of the telescopic crossbar being connected to a telescopic vertical shaft the telescopic vertical shaft being perpendicular to the telescopic crossbar and the ground, and the telescopic crossbar rotating about the pivot to drive the telescopic vertical shaft to move, the operations comprising:

receiving a detection initiating request, the detection initiating request including: a position of the telescopic vertical shaft, a length of the telescopic vertical shaft and a set movement speed of the telescopic vertical shaft; and performing the following detection steps: detecting the telescopic vertical shaft; determining an anticipated detection time based on the position of the telescopic vertical shaft and the set movement speed; recording an actual detection time in response to detecting the telescopic vertical shaft; determining a missed detection position of the telescopic vertical shaft based on a time difference between the actual detection time and the anticipated detection time and the set movement speed, in response to confirming the actual detection time being different from the anticipated detection time; and determining a blind zone based on the length of the telescopic vertical shaft and the missed detection position.

12. The non-transitory computer storage medium according to claim 11, the operations further comprising:

receiving a crossbar length change detection request, wherein the crossbar length change detection request includes a detection initiating time when a current length of the telescopic crossbar is changed, a position of the telescopic vertical shaft after the current length of the telescopic crossbar is changed and a set movement speed of the telescopic vertical shaft after the current length of the telescopic crossbar is changed; and performing the above detection steps according to the detection initiating time when the current length of the telescopic crossbar is changed.

13. The non-transitory computer storage medium according to claim 11, the operations further comprising:

receiving a crossbar length and vertical shaft length change detection request, wherein the crossbar length and vertical shaft length change detection request includes a detection initiating time when a current length of the telescopic crossbar and the telescopic vertical shaft is changed, a length of the telescopic vertical shaft after the current change, a position of the telescopic vertical shaft after the current length of the telescopic crossbar and the telescopic vertical shaft is changed and a set movement speed of the telescopic vertical shaft after the current length of the telescopic crossbar and the telescopic vertical shaft is changed; and performing the above detection steps according to the detection initiating time when the current length of the crossbar and the vertical shaft is changed.

14. The non-transitory computer storage medium according to claim 12, wherein the length of the telescopic vertical shaft is a preset minimum length of the telescopic vertical shaft.

15. The non-transitory computer storage medium according to claim 13, wherein a length of the telescopic crossbar is proportional to the length of the telescopic vertical shaft.

* * * * *